United States Patent [19]

Mahon

[11] Patent Number: 4,523,062
[45] Date of Patent: Jun. 11, 1985

[54] ELECTRICAL APPLIANCE PROGRAMMING
[75] Inventor: Joseph J. Mahon, Libertyville, Ill.
[73] Assignee: Eaton Corporation, Cleveland, Ohio
[21] Appl. No.: 490,269
[22] Filed: May 2, 1983
[51] Int. Cl.³ .............................................. H01H 43/00
[52] U.S. Cl. ................................ 200/35 R; 200/38 R
[58] Field of Search ................. 200/35 R, 38 R, 38 B, 200/38 BA, 38 C, 38 CA, 39

[56] References Cited

U.S. PATENT DOCUMENTS

| | | | |
|---|---|---|---|
| 2,964,933 | 12/1960 | Fritz | 200/38 B X |
| 3,296,465 | 1/1967 | Knerr | 200/38 C |
| 3,548,126 | 12/1970 | Bassett | 200/38 |
| 3,603,749 | 9/1971 | Davis | 200/38 C |
| 3,717,043 | 2/1973 | Cartier | 74/112 |
| 4,153,824 | 5/1979 | Blackmond | 200/35 R |
| 4,381,433 | 4/1983 | Wagle | 200/38 C X |

Primary Examiner—J. R. Scott
Attorney, Agent, or Firm—C. H. Grace; R. A. Johnston

[57] ABSTRACT

A timing control system and timer sub-assembly for microwave cooking source parallel connected with a timer and series connected with an interval time switch and a defrost cycle switch and a power level selector. The timer is operable to cycle the defrost switch at a fast rate for selected operating timer intervals of a given value or greater and a slow rate for selected interval less than the given value. The timer provides progressively decreasing "on" time of the defrost cycle switch for each cycle. The timer sub-assembly has a pawl-driven ratchet wheel having a toothed sector of lesser pitch diameter and a masking ratchet wheel having periodic deep notches spaced thereabout for permitting the drive pawl to periodically engage the teeth lesser pitch diameter for slower advance of the driven ratchet wheel for indexing a plurality of rotary cam tracks for microwave sources switch actuation.

7 Claims, 5 Drawing Figures

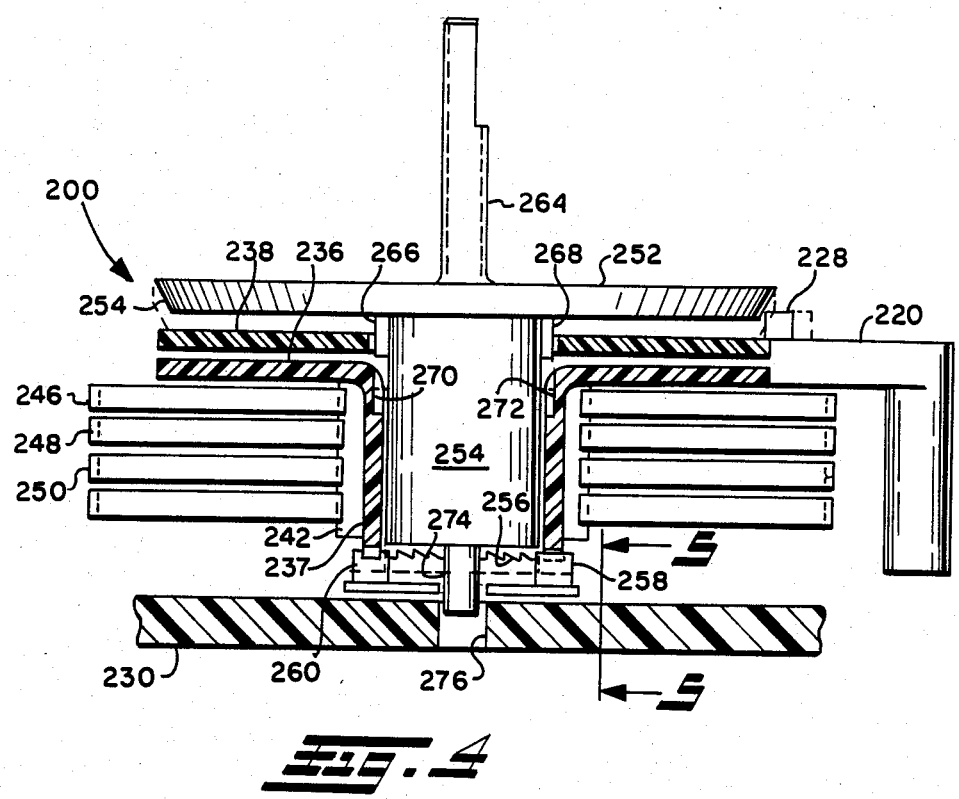
Fig. 4
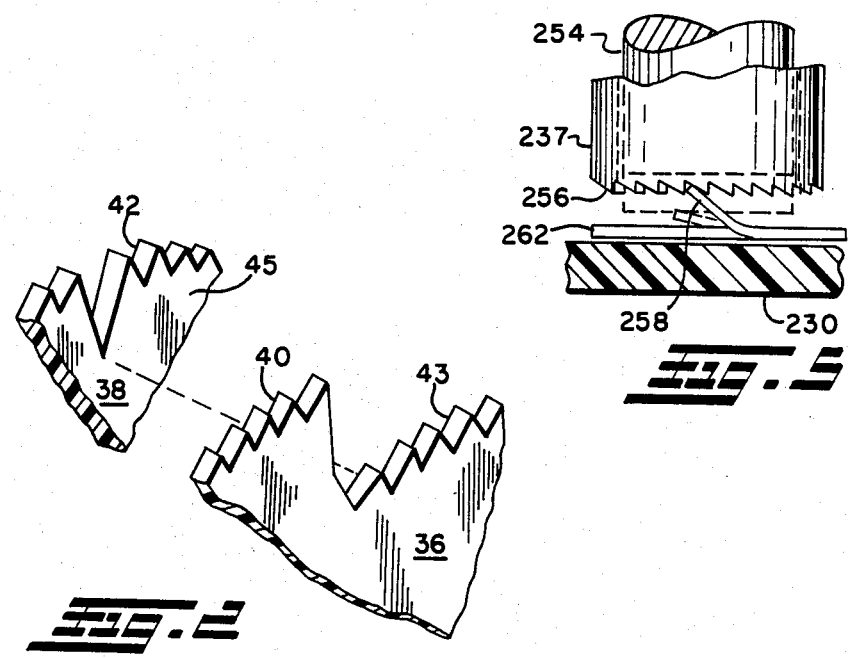
Fig. 5
Fig. 2

ELECTRICAL APPLIANCE PROGRAMMING

BACKGROUND OF THE INVENTION

The present invention relates to programming of cycle duration and control functions performed during the service cycle of electrically operated appliances. The invention relates particularly to programming of the duration and function of the service cycle of domestic appliances such as washing machines, clothes dryers and microwave cooking ovens. Such appliances typically employ an electromechanical programmer timer powered by a subfractional horsepower timing motor operating a series of cams for making and breaking a plurality of electrical contacts at the appropriate time during the service cycle. The contacts control current flow in circuits for controlling various electrically operated functions on the appliance in a predetermined program sequence.

For example, it is known to employ an electromechanical programmer timer to control the solenoid operated water inlet valve and drain pump motor of a domestic washing machine and to control the timed energization of a magnetron for microwave cooking. Programmer timers for such applications are known to employ a rotatable drum having a plurality of spaced peripheral cam tracks where the drum is driven by an escapement comprising a ratchet and pawl advance mechanism.

In known programmers of the latter type, the timing motor typically provides periodic stroking of the advance pawl, as for example by a rotating eccentric, driven by a suitable rate reducing gear train which is driven by the timing motor. Such a programmer timer provides for a single rate of advancement of the cam drum and relies upon variation of the lobes on the individual cam tracks to provide the desired sequence for programming electrical control functions as the cam tracks are advanced.

Programmer timers of the aforesaid type usually employ a means for permitting manual rotation of the cam drum to preset the programmer at a desired position in the program cycle for beginning the timing motor powered advance of the cam drum. Thus, the length of the program cycle may be varied by manually setting the cam drum at a preselected fraction of its total arc of rotation.

However, it has been desired in certain appliance applications, as for example microwave cooking devices, to find a way or means of providing a variable sequence of timing for the various control functions during the program cycle, where the difference or variation in the timing sequence is related to the overall length or duration of the program cycle selected. It has been proposed to provide a plurality of program timers for controlling the appliance cycle wherein separate programmer timers would be employed therein dependent upon the type or length of program cycle selected.

This proposal, however, has the distinct disadvantage in increasing the cost of the appliance by virtue of the multiple timing motors and gear trains required for providing the desired degree of sophistication of the appliance program cycle.

Alternatively it is known to provide all electronic timing control of the programmer cycle and operate the various control function circuits by employing solid state electronic power switching. This technique has provided the desirable variation in cycle program and timing but has proved prohibitively costly. Accordingly, it has long been desired to provide a way or means for varying the program sequence timing and cycle duration for an electrical appliance with a simple low cost electro-mechanical programmer timer operated by a single timing motor.

SUMMARY OF THE INVENTION

The present invention relates to electromechanical programming and timing for domestic appliances such as microwave cooking ovens, clothes washers and dryers. The present invention provides a uniquely variable program cycle and novel dual rate programmer timer operated by a single timing motor. The timer is manually settable for providing a desired duration of program cycle. The program timer of the present invention has the unique capability of providing variation of the program timing sequence dependent upon the selected fraction of the full length program cycle. The programmer timer of the present invention thus permits a degree of sophistication of control of the appliance function and provides for coupling variation in function in accordance with the length of the program cycle in a manner heretofore unachievable by electro-mechanical means.

The programmer timer of the present invention enables the appliance operation to be varied as the program cycle duration is varied.

A variable program timing sequence is particularly useful in microwave cooking for defrosting or thawing large and small masses of frozen food. In defrosting larger masses of frozen food, it has been found desirable to employ a feature of the invention to provide full magnetron operation for an initial portion of the defrost cycle followed by intermitent operation at spaced intervals and for sequentially decreasing periods of "on" time for the balance of the defrost cycle.

According to another feature of the invention, the cooking program of a microwave magnetron may be varied by to provide different "on" time cycling periods during the cooking program without changing the duration of the cooking program. This feature permits changing the effective power level for the program cycle irrespective of the duration of the program cycle.

In another feature of the present invention a unique electromechanical programmer timer is provided which is capable of providing differing rates of switch cam advance depending upon the selected position of the cam means. The present invention employs only a single timing motor operating through a gear train to drive an oscillating pawl type ratchet advance mechanism for advancing a drum having a plurality of axially spaced cam tracks for effecting operation of electrical switches. The advance mechanism of the present programmer timer employs a single eccentric driven advance pawl contacting a toothed driving ratchet and is axially adjacent masking ratchet having a plurality of radially deep notches formed in the peripheral teeth thereof. The deep notches are disposed at intervals corresponding to a selected arcuate sector including a desired number of masking ratchet teeth. The advance pawl drops into the deep notches upon advance of the ratchet in the amount of the arcuate sector or intermediate number of teeth. The advance pawl extends axially sufficiently to contact both ratchet wheels. An arcuate sector of the driving ratchet has teeth of pitch and root diameter corresponding to the teeth of the masking ratchet. A second arcuate sector of the driving ratchet has peripheral teeth of root diameter corresponding to the deep notches in the masking ratchet.

Upon manual positioning of the driving ratchet under the pawl for effecting initial pawl contact with the larger diameter toothed sector thereof, and upon energization of the timing motor, the pawl indexes the drive ratchet at a faster rate corresponding to the pitch of the larger diameter sector teeth.

Upon manual positioning of the drive ratchet such that the sector having teeth of lesser pitch diameter are disposed under the pawl, and upon motor energization the masking ratchet is effective to prevent the pawl from engaging the drive ratchet teeth except when the pawl is engaged with one of the deep notches in the masking ratchet. Thus, the drive ratchet is advanced at a slower rate corresponding to the frequency of occurrence of the deep notches in the masking ratchet.

The present invention thus provides a unique appliance program providing one rate of advance of the timer cam drum upon an initial setting of the cam drum for a given fraction of total cycle duration; and, provides a second rate of advance for an initial setting of the timer cam drum for a second lesser fraction of the total cycle duration. The programmer timer of the present invention thus permits a single cam drum to be rotated at different rates depending upon the duration of cycle time chosen.

Different cam tracks are provided on the drum for control function switch operation at two different rates or frequencies in view of the different rate of advance of the cam tracks. This feature thus permits different rate of cycling of electrical control functions during overall program cycles of different duration.

Another feature of the invention provides sub-interval electrical switching by providing a rotating cam on the advance pawl eccentric drive shaft for making and breaking electrical contacts. The sub-interval switching is employed to provide electrical control function cycling for either a major or minor portion of the sub-interval period to thereby provide an effective power level control function in the appliance. A power level selector switch permits the appliance operator to select either full time power, or a major, or a minor fraction of the sub-interval period for power application.

The present invention thus provides an appliance program cycle whereby the programmer timer provides selectably different sub-interval cycle "on" time for control cycling for the cycle, irrespective of the length of the program.

BRIEF DESCRIPTION OF THE DRAWINGS

FIG. 2 is an enlarged view in perspective of a portion of the drive and masking ratchet of the embodiment of FIG. 1.

FIG. 4 is a section view taken through the axis of the cam drum of another embodiment the assembled programmer timer.

FIG. 5 is a partial section view taken along section indicating lines 5—5 of FIG. 4.

DETAILED DESCRIPTION

Figure 1:
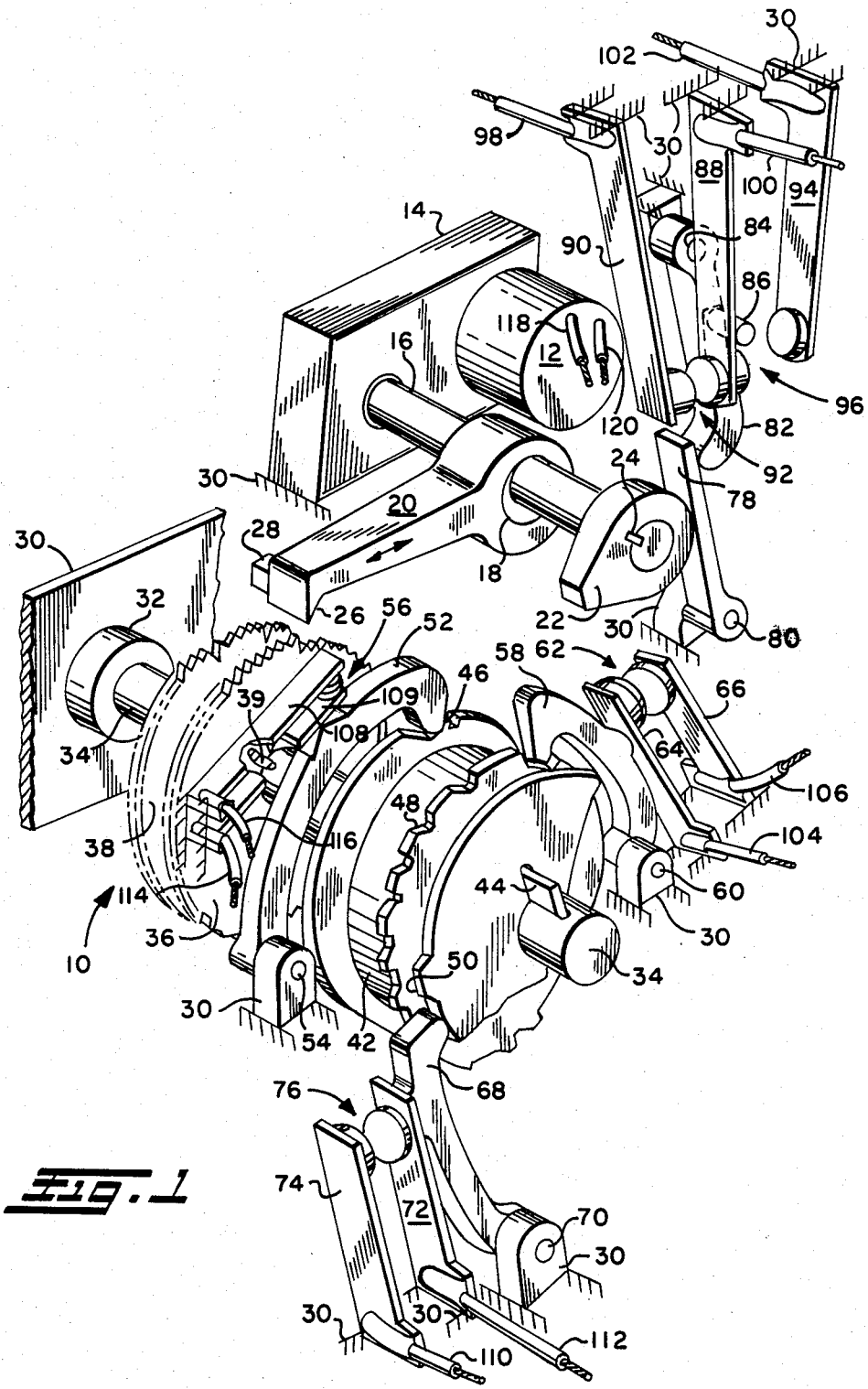
FIG. 1 is an exploded view in perspective of the operating mechanism of the programmer timer of the present invention.

Referring to FIG. 1 the programmer timer indicated generally at 10 and has a timing motor 12, preferably of the subfractional horsepower synchronous type known in the art. Motor 12 is mounted to a gear box 14 which contains a suitable gear reduction train (not shown) for rotatably driving an output shaft 16. An eccentric 18 is provided on the output shaft 16 and has received thereover in rotationally sliding engagement one end of an advance pawl 20. Upon rotation of shaft 16 the eccentric 18 causes the end of pawl 20 to orbit thereabout, thus producing longitudinal oscillation of the pawl 20 in the direction indicated by the doubled headed black arrow in FIG. 1.

Additionally, the shaft 16 has a cam lobe 22 attached thereto for rotation therewith by a suitable expedient such as key 24 received in complementary grooves formed in the cam lobe and shaft 16. The free end of pawl 20 has a chisel point or tooth 26 extending therefrom generally at right angles thereto. A lug 28 is provided on the side of pawl 20 adjacent the end thereof and extends outwardly therefrom generally at right angles to the direction of pawl movement.

The base or housing 30 of the programmer timer has a suitable support bearing means 32, which has rotatably journaled therein a drum shaft 34 which has secured thereto a ratchet wheel 36 for effecting rotation of shaft 34. The drive ratchet 36 is secured to shaft 34 for effecting rotation thereof by any suitable expedient as for example the shaft key 39. It will be understood that drum shaft 34 may be journaled at either or both ends as desired for convenience in housing design.

A masking ratchet wheel 38 is disposed on shaft 34 axially closely spaced with driving ratchet 36; and, the masking ratchet 38 is free to rotate about shaft 34. It will be seen from FIG. 1 that, the axial spacing between ratchet wheels 36 and 38 is not greater than the width of pawl tooth 26 such that the pawl tooth 26 is enabled to contact both ratchet wheels.

Referring now to FIG. 2, a portion of each of the ratchet wheels 36, 38 is illustrated wherein the driving ratchet 36 is shown as having a plurality of peripheral teeth 40 formed about the larger diameter peripheral sector thereof. The teeth 40 extend for an arcuate sector comprising approximately half the circumference of the wheel 36. The masking ratchet 38 has teeth 42 provided about the periphery thereof and which have the same pitch and root diameter as the teeth 40 provided on the driving ratchet 36.

The balance of the periphery of the driving ratchet 36 comprises a sector having teeth 43 provided thereon which have a major diameter substantially less than the root diameter of teeth 40, but having a pitch generally the same as the teeth 40 for compatibility in contacting pawl tooth 26.

The masking ratchet 38 has a plurality of deep notches 45 provided in the teeth 42 which notches 45 are spaced about the periphery of the ratchet wheel 38 such that a common integral number of teeth 42 occur intermediate the notches 45. The root diameter of the deep notches 45 corresponds to the root diameter of the teeth 43 on the driving ratchet wheel 36. Thus, when the advance pawl tooth 26 enters one of the deep notches 45, if the sector of the driving ratchet wheel 36 having the teeth 40 is under the pawl tooth 26, the pawl tooth does not drop into the deep notch 45 but remains in the tooth 40.

However, if the driving ratchet 36 is positioned such that the arcuate sector having the teeth 43 of lesser diameter is positioned under the pawl tooth 26, the pawl tooth is enabled to drop into a deep notch 26 and engage the teeth 43 for advancing the drive ratchet 36 by an amount equal to the pitch spacing of the teeth 43. In this mode of operation, the drive ratchet 36 can be indexed by one notch only upon the drive pawl 26 contacting one of the deep notches 45 in the masking ratchet 38.

Shaft 34 also has thereon a cam drum 42 secured for rotation therewith by suitable means, such as key 44, and drum 42 is disposed in axially spaced arrangement from the drive ratchet 36. The cam drum 42 has a plurality of circular peripheral cam tracks 46, 48, 50 provided thereon in axially spaced arrangement.

Cam track 46 has a single notch provided thereon for contact by cam follower 52 which is pivotally mounted to the base 30 by pin 54. Cam follower 52 is operative to make and break a set of contacts, indicated generally at 56, which are preferably mounted from a pair of resilient arms extending in cantilever from the base structure. In the presently preferred practice the cam 46 and switch contacts 56 are employed to control duration of the overall appliance program cycle.

Cam track 48 has a plurality of peripherally spaced notches therein with the notches spaced progressively closer in the direction of rotation to thus provide a series of cam follower lifts of progressively decreasing width. In the presently preferred practice, cam track 48 and switch contacts 62 are employed for control of "DEFROST" mode of operation as will be hereinafter described. A cam follower 58 pivotally mounted to the base 30 by pin 60 is operative to actuate a set of electrical contacts attached to a pair of resilient arms 64, 66 anchored at one end to the base 30. The notches in cam track 48 are of sufficient depth to enable cam follower 58 to open the contacts 62 upon recession of the cam follower into the notches.

The third cam track 50 on drum 42 has a lobe thereon which is operably contacted by cam follower 68 which is pivotally mounted by pin 70 to base 30. The cam follower 68 operatively contacts one of a pair of resilient contact arms 72, 74 extending in cantilever from base 30 and having a set of electrical contacts, indicated generally at 76, which are closed by the cam follower 68 contacting the lobe in cam track 50. In the presently preferred practice, cam track 50 and switch contacts 76 are employed for an auxiliary function such as energizing an electrical resistance heating element as will be hereinafter described.

The cam lobe 22 rotatable with the shaft 16 for advancing the pawl 20, has a cam follower 78 which is pivotally mounted at one end about pin 80 attached to the base 30. A lever arm 82 has one end thereof in contact with cam follower 78 and the other end pivotally mounted about pin 84 secured to base 30 such that movement of the cam follower 78 in response to rotation of cam 22 effects corresponding movement of lever arm 82. A projecting lug 86 extends from the side of lever arm 82 for contacting one of a pair of resilient arms 88, 90 which extend in cantilever from base 30. Arms 88, 90 have a set of contacts, indicated generally at 92, mounted on the free end thereof. The lug 86 is operative to maintain the contact set 92 closed when the cam follower 78 is in contact with the base circle portion of cam 22.

A third contact arm 94 formed of resilient material is provided and extends in cantilever from base 30 with a contact thereon and disposed to form a contact set, indicated generally at 96, with a corresponding contact provided on the side of arm 88 opposite the contact set 92. In operation, movement of cam follower 78 by cam lobe 22 causes lever arm 82 to move the lug 86 to a position permitting contact set 92 to open and causing contact set 96 to close.

Each of the contact arms 90, 88, 94 has respectively an electrical lead attachment 98, 100, 102 attached thereto by any suitable expedient as for example soldering. Similarly, contact arms 64, 66 have electrical leads 104, 106 respectively connected thereto. In like manner leads 110, 112 are attached to contact arms 74, 72 respectively and leads 114, 116 extend from the contact arms 108, 109 supporting contact set 56.

Figure 3:
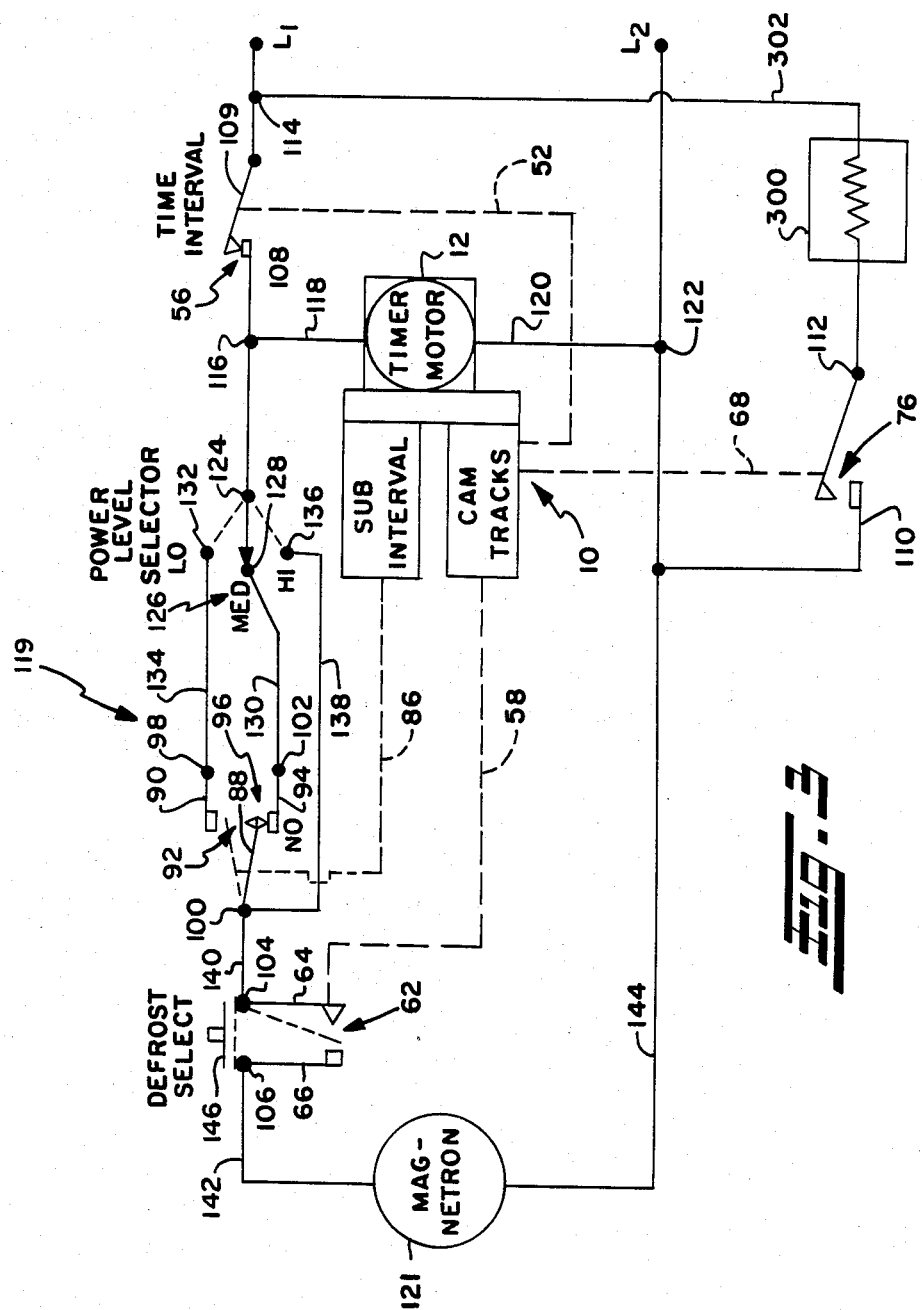
FIG. 3 is a schematic of the appliance control system employing the programmer timer of FIG. 1.

Referring now to FIG. 3, an electrical schematic is shown of one embodiment of the invention having the timer 10 of FIG. 1 incorporated in a control system 119 for a cooking appliance employing an electrically energizable magnetron 121 for providing a source of microwave radiation.

With reference to FIGS. 1 and 3, lead 114 from switch contact arm 109 is connected to one side $L_1$ of an electrical power line. The other lead 116 from switch contact arm 108 is connected via lead 116 to one power lead 118 of timer motor 12; and, the other power lead 120 of the timer motor is connected via junction 122 to the other side $L_2$ of an electrical power line.

The junction of leads 118 and 116 is connected to a common terminal 124 of three-position switch shown generally at 126. The center contact position 128 of the three-position switch is connected via lead 130 to lead 102 of switch contact arm 94. The righthand contact position 132 of switch 126 is connected via lead 134 to lead 98 of switch arm 90. The lefthand contact position 136 of switch 126 is connected via lead 138 to lead 100 of the common switch arm 88 to provide a shunt or bypass of switch contacts 92 and 96.

The lead 100 of the common switch arm 88 is also connected via lead 140 to lead 104 of switch arm 64. Lead 106 of switch arm 66 is connected via lead 142 to one side of magnetron 122 and the other side of the magnetron is connected via lead 144 to power line junction 122.

A manually operated switching means 146 is provided to bypass the switch contacts 62 upon manual closing of the switch bar 146 which interconnects the switch leads 106, 104 by means of any suitable switching mechanism.

Power level selector switch 126 is also manually movable between the three positions for selecting the desired percentage of duty cycle for magnetron operation for any given program interval as will hereinafter be described.

In operation, the cam drum 42 is manually rotated to a position representing a desired subdivision of one of the toothed sectors of driving ratchet 36 and thereby positions cam follower 52 out of the notch in cam track 46 such that the follower 52 is lifted and switch contacts 56 are closed.

Closure of contacts 56 energizes the timing motor 12 and causes the driving ratchet wheel 36 to have the desired set of teeth 40 or 44 engaged by the driving pawl 26. Rotation of the timing motor causes the pawl to be oscillated by rotation of eccentric 18 and ratchet wheel 36 the drum 42 are indexed until such time as cam follower 52 drops into the notch on cam track 46 thereby opening contacts 56 and shutting off power to complete the appliance program cycle.

The rate of rotation of cam drum 42, and consequently cam tracks 46, 48 and 50, is thus dependent upon the initial position of pawl 26, with relation to the sets of teeth 40, 44 of the driving ratchet 36. If the pawl 26 is initially positioned on the teeth 44, the drive ratchet 36 and cam drum 42 will be indexed at a rate of on pitch of teeth 40 per stroke of pawl 26 which is substantially faster than the rate if the pawl 26 is initially positioned in teeth 44.

The lesser rate of indexing where the pawl 26 is initially positioned on teeth 44 may be expressed as a fraction of the rate of rotation associated with the teeth 40 by dividing the number of deep notches 46 on masking ratchet wheel 38 by the total number of teeth 42 on the masking ratchet. It will be understood that the angular position of the drive ratchet and cam drum may be correlated to the number of minutes required to complete rotation through either of the sectors containing teeth 44 or 42 and the fraction of the sector marked in minutes on a rotary dial (not shown in FIG. 1) associated with the ratchet wheel. In the presently preferred practice, the motor 12 and gearbox 14 effect rotation of shaft 34 at a rate of 4 RPM or one revolution every 15 seconds. The driving ratchet wheel 36 preferably has the arcuate sectors containing peripheral teeth 44 and 40 each extending for one-half of the periphery or 180° subtended central angle. The number of deep notches 46 on the masking ratchet is preferably chosen such that the pawl 26 indexes all of the teeth 44 in thirty minutes. The pitch of teeth 42, 40, and 44 is preferably chosen such that the pawl 26 indexes all of the teeth 40 in five minutes. The slope of the backside of pawl teeth 26 is arranged such that when driving ratchet is initially positioned on the teeth 44, upon indexing to the end of teeth 44, the pawl will "climb" from teeth 44 to teeth 40 and finish "timing out" to zero and the notch in cam track 46 on ratchet teeth 40.

If ratchet wheel 36 is initially positioned with pawl 26 engaging teeth 40, the drum will be indexed to "time out" to zero in five minute or less, depending upon the initial position as a fraction of the 180° sector comprising teeth 40. Thus the cam drum 42 will be indexed 180° in five minutes or less thereby providing greater internal accuracy of shut off for the notch in cam track 46.

Referring to FIG. 3, if the three position switch 126 is set in the center position shown in solid outline. line power is applied through switch contacts 96 and contacts 62 or shunt switch 146 to the magnetron 122. Switch contact set 92 is cycled between an open and closed position by the subinterval cam 22 mounted on output shaft 16. Cam 22, through lever arm lug 86, is operative to open the contact set 96 only during the interval of lift provided by cam lobe 22. Preferably, cam lobe 22 is configured such that the interval of lift is a minor proportion of the period of revolution of cam 22 and thus contacts 96 are closed for a major portion of their duty cycle. In the presently preferred practice, the period of lift of lobe 22 is approximately one third of the period of complete rotation of shaft 16.

Conversely the contact set 92, which is simultaneously cycled by movement of switch arm 88 through contact with lever arm lug 86, has a major portion of its duty cycle closed and a minor portion, comprising the lift period of cam 22, in the closed position. Thus, if the selector switch 126 is moved from the position shown in solid outline in FIG. 3 to the upward position indicated by dashed line for completing a circuit through the righthand or "low" contact 132, a set of contacts is closed for applying power to the magnetron for one-third of each sud-interval period of cam 22.

If selector switch 126 is moved to the center or "medium" power position completing a circuit through contact 128, a set of contacts will be closed for two-thirds of each sub-interval period of cam 22.

It will be understood that if one hundred percent duty cycle, or full time, power application is desired for the magnetron 122, switch 126 will be moved to the downward position shown in the dashed outline in FIG. 3 to apply power to the magnetron through left hand or "high" switch contact 136. Thus, power level selector switch 126 enables the operator of the microwave cooking appliance to select one of three separate schemes of applying power to the magnetron during any selected program interval.

When it is desired to operate the microwave appliance in the "DEFROST" mode, a selector switch 146 is manually moved by the operator to the open position, shown in solid outline in FIG. 3, to permit power to the magnetron 122 to be controlled by switch contacts 62.

The switch contacts 62 are moved in response to motion of cam follower 58 which is guided by cam track 48. The notches in cam track 48 are disposed peripherally therealong in sequentially closer spacing as described above so as to provide cam lobes on track 48 which have successively decreasing width. This arrangement for cam track 48 provides sequentially decreasing periods of "ON" time or closure of contact set 62 and consequent magnetron energization. Thus, the "DEFROST" mode of operation produces a succession of "ON" pulses to the magnetron which sequentially decrease in duration. This arrangement provides initial thawing at a higher rate of power application and sequentially decrease the rate of power application for thawing to a lower rate of microwave application.

It will be understood that during the "DEFROST" mode of operation, with switch 146 in a closed position, the power level selector switch 126 is preferably positioned in the "HI" position or in the position completing a circuit through contact 136 to bypass switch contact set 92, 94.

Referring now to FIGS. 4 and 5 another embodiment 200 of the timer of the present invention is illustrated having a cam drum 242 with cam tracks 246, 248 and 250 which correspond to cam tracks 46, 48 and 50 in the timer embodiment of FIG. 1. The timer 200 has a driving ratchet 236 similar to ratchet 36 of the embodiment of FIG. 1; and, the ratchet wheel 236 has an integral hollow axial hub portion 237 which is received in and secured to drum 242 for effecting rotation thereof.

Timer 200 also has a masking ratchet wheel 238 which is similar to the ratchet wheel 38 of the embodiment of FIG. 1. An advance pawl 220 has a lug 228 provided thereon similar to lug 28 the embodiment of FIG. 1; and, the pawl 220 is operative to engage the ratchet wheels 236, 238 in driving engagement for indexing.

A push-to-set wheel 252 has a camming surface 254 formed on the periphery thereof which is operative upon axial movement of the wheel 252 to contact pawl lug 228 for movement of the pawl to 220 to effect disengagement from ratchet wheels 238, 236. In the solid outline position of wheel 252 shown in FIG. 4, the wheel hub 254 engages the inner periphery of the driving ratchet hub 237 in free sliding contact such that rotation of one relative the other is freely permitted. The downward axially moved position of wheel 252 for disengagement of driving pawl 220 is shown in dashed outline in FIG. 4.

Referring to FIG. 4 and FIG. 5 the hollow hub 237 of the driving ratchet wheel has a plurality of ratchet teeth 256 provided on a lower axial end thereof. Teeth 256 engage a pair of diametrically oppositely disposed spring tabs 258, 260 which are integrally formed with and extend upwardly from a washer 262 which registers against the base or housing 230 of the timer. In the solid outline position of the wheel 252 shown in FIGS. 4 and 5, spring tabs 258, 260 serve to prevent anti-clockwise rotation of wheel 252, when viewed from the upper face thereof in FIG. 4. Tabs 258, 260 are effective to ratchet on teeth 256 to permit forward (clockwise) rotation of drum 237 in response to stroking of ratchet 236 by the advance pawl 220. The push-to-set wheel 252 is free to rotate in either direction when disposed in its upward limit position shown in solid outline in FIG. 4, in which position it has no effect on the remaining components of the timer.

In operation, when it is desired to manually reset the timer for a desired program cycle duration, the operator pushes on a knob (not shown) attached to the shaft 64 extending from push-to-set wheel 252, and moves the wheel 252 and hub 254 downwardly to the position indicated by dashed outline in FIGS. 4 and 5. As the hub 254 is moved downwardly an engagement means, preferably in the form of diametrially opposed lugs 266, 268 formed on the hub 254, engages corresponding slots 270, 272 formed on the inner periphery of ratchet hub 237 at the upper end thereof.

With the wheel 252 in the downward position, the lower end of wheel hub 254 engages the upper edge of spring tabs 260, 258 and disengages the spring tabs from the ratchet teeth 256 on the timing ratchet hub. The downward position of hub 254 with the spring tabs disengaged is shown in dashed outline in FIG. 5.

With the spring tabs 258, 260 disengaged from ratchet 256, wheel 252, driving ratchet wheel 236 and the cam drum 242 may then be rotated to the desired initial.

Referring to FIGS. 1 and 3 the auxiliary contacts 76 are closed by cam follower 68 being lifted by cam lobe 50. The contact lead 112 is connected preferably to one side of a resistance heater 300 for "browning" and is connected via lead 302 to power line L$_1$. Contact lead 110 from switch contact arm 74 is connected to power line L$_2$ such that closure of contact set 76 energizes heater 300. Preferably, cam track lobe 50 is positioned to energize heater 300 just as interval cam track 46 cuts off power to magnetron 122.

In the presently preferred practice of the invention, the wheel drum 254 has a pilot shaft 274 which is slidably journaled in an aperture 276 provided in the housing.

The present invention thus provides a unique power level control for an electrical appliance in which the appliance operation may be cycled intermittently for either major or minor proportion of a sub-interval duty cycle "ON" time by merely positioning a selector switch. The fractional sub-interval cycling continues for the duration of the appliance program cycle to selectively give an effective power level less than full "ON".

The programmer timer in the present invention enables a program cam drum to be advanced at one of two different rates of advance and yet the timer is powered by a single timing motor. The rate of advance is selected by the proper choice of initial timer cycle duration. The timer advances the switch controlling cam tracks at a faster rate for shorter selected program intervals to permit finer resolution time control of the switch cycling by the cam track. Otherwise during programs having a shorter duration only a small fraction of rotation of the ratchet indexing wheel would be advanced when indexed at the higher rate.

The timing control of the present invention also has an operational mode which permits the appliance power to be cycled with sequentially decreasing "ON" time during each cycle.

In another feature of the invention the programmer timer employs a unique push-to-set mechanism which upon pushing of the control knob releases the anti-rotation cam drum ratchet spring and engages the drum to permit selected initial positioning of the cam drum.

Although the invention has hereinabove been described with respect to the illustrated embodiments, it will be understood that modifications and variations in the invention may be made and the invention is limited only by the following claims.

What is claimed is:

1. An appliance timer comprising:
   (a) motor means operable, upon connection to a source of power, to provide rotation of an output shaft;
   (b) advance pawl means connected to said output shaft and operative for cyclical advancement and retraction upon rotation of said output shaft;
   (c) ratchet means operative to be sequentially advanced by said pawl means advancement, said ratchet means including:
      (i) a driven ratchet wheel having an arcuate sector of the outer periphery formed into primary ratchet teeth of a first pitch diameter and the circumferentially adjacent arcuate sector forming the driven ratchet wheel remainder of the formed into secondary ratchet teeth of a major diameter less than the root diameter of the teeth of said first pitch diameter,
      (ii) a masking ratchet wheel disposed closely adjacent said driven ratchet, said masking ratchet having ratchet teeth formed about the periphery thereof, said teeth having substantially the same pitch and pitch diameter as said driven ratchet teeth of said first pitch diameter, said masking ratchet having a plurality of radially deep notches formed on the periphery thereof and space circumferentially between a selected multiple of said teeth, said deep notches having the root diameter thereof not greater than the root diameter of said driven ratchet secondary teeth, wherein, said driven ratchet and said masking ratchet are disposed to be advanced by said pawl means and axially spaced an amount not greater than the width of said pawl means; and,
   (d) said pawl means is operative upon said advancement to index said driven ratchet wheel and said masking wheel one-for-one when said pawl means contacts said primary ratchet teeth of said first diameter, and said pawl means is operative upon said advancement to index said driven ratchet secondary teeth only when said pawl means drops into one of said deep notches on said masking ratchet; and,
   (e) main cam means rotatable upon indexing of said driven ratchet;
   (f) switch means, including main cam follower means operatively contacting said cam means for making and breaking an electrical circuit upon preselected indexing of said driven ratchet wheel.

2. The timer defined in claim 1, wherein said cam means includes a cam wheel having a plurality of spaced lobes thereabout having the circumferential length thereof progressively decreasing in the direction of advancement.

3. The device defined in claim 1 wherein said advance pawl means is operatively connected to said output shaft by an eccentric means.

4. The device defined is claim 1, wherein;
  (a) said shaft means includes second cam means; and,
  (b) said switch means includes;
    (i) a first cam follower with a first set of electrical contacts, said first cam follower contacting said main cam means operative to cause making and breaking of said first set of contacts in response to indexing of said driven ratchet wheel,
    (ii) a second set of electrical contacts with a second cam follower operative to contact said second cam means operative for making and breaking said second contact set in response to rotation of said second cam means.

5. An appliance programming timer comprising:
  (a) housing means
  (b) motor means including output shaft means mounted on said housing means and operable, upon connection to a source of power, to provide timed rotation of said shaft;
  (c) cam means mounted on said base means and operable for rotation thereon;
  (d) cam advance means operably connected to said output shaft to effect step-by-step rotational advance of said cam means; said cam advance means including,
    (i) pawl means and,
    (ii) a driven ratchet wheel driven by said pawl and having a first arcuate sector with ratchet teeth thereon of greatest root diameter and the remainder thereof comprising a second arcuate sector circumferentially adjoining said first sector and having teeth of lesser root diameter than the teeth of said first sector;
  (e) switch means, including cam follower means operably responsive to said cam means for making and breaking circuit connection;
  (f) masking means contacted by said pawl and operable to permit said pawl to advance said ratchet wheel one-for-one when said pawl contacts said first sector of teeth and operable to cause said wheel to be advanced at a fraction of the rate of said one-for-one for said second sector portion of rotational advance.

6. The programmer timer defined in claim 5, wherein said first sector of teeth of greatest root diameter comprises a minor fraction of the circumference of said ratchet wheel and said second sector comprises the remainder of the circumference thereof.

7. The programmer timer defined in claim 5, wherein said masking means comprises a second ratchet wheel co-axially disposed adjacent said driven ratchet, said second ratchet wheel having teeth of common pitch and root diameter with said teeth of said first sector, and has a plurality of deep notches disposed about the circumference of said second ratchet wheel at an integral multiple of the number of said first sector teeth, said deep notches having a common root diameter with said second sector teeth.

* * * * *